United States Patent [19]

Shimoi

[11] 4,091,377
[45] May 23, 1978

[54] DIGITAL DISPLAY DRIVING CIRCUIT

[75] Inventor: Akio Shimoi, Suwa, Japan

[73] Assignee: Kabushiki Kaisha Suwa Seikosha, Tokyo, Japan

[21] Appl. No.: 679,533

[22] Filed: Apr. 23, 1976

[30] Foreign Application Priority Data

Apr. 23, 1975 Japan ............................ 50-49289

[51] Int. Cl.² ............................ G09F 9/32; G02F 1/13
[52] U.S. Cl. ................................... 340/336; 350/333
[58] Field of Search .................. 340/336; 350/160 LL

[56] References Cited

U.S. PATENT DOCUMENTS

| 3,845,615 | 11/1974 | Cake | 340/336 |
|---|---|---|---|
| 3,863,247 | 1/1975 | Hosokawa | 350/160 LL |
| 3,903,518 | 9/1975 | Hatsukano | 340/336 |
| 3,973,254 | 8/1976 | Nomiya et al. | 340/336 |

Primary Examiner—David L. Trafton
Attorney, Agent, or Firm—Blum, Moscovitz, Friedman & Kaplan

[57] ABSTRACT

An improved digital display driving circuit is provided. The display includes first and second display digits, the first display digit and second display digit being respectively formed by a plurality of segment electrodes, at least one digit electrode spaced apart from the segment electrodes and material disposed between the segments electrode and the digit electrode. Regions of the material are adapted to be rendered visually distinguishable from adjacent regions by the application of an electric field across the region. The regions of the material in registration with the segment electrodes are rendered visually distinguishable in response to a predetermined potential difference being applied across any one of the respective spaced apart segment electrodes and the digit electrodes. The invention is characterized by the first digit electrode and second digit electrode being referenced during alternating driving intervals of time to a potential such that the regions of the material in registration therewith are prevented from being rendered visually distinguishable. Each of the segment electrodes forming the first digit are coupled to a corresponding segment electrode forming the second digit to define a plurality of segment electrode pairs. A memory includes a plurality of outputs coupled to each pair of segment electrodes to reference each pair of electrodes to one of a first drive potential and second drive potential to be compared during each driving interval of time with the potential of the respective digit electrodes spaced apart therefrom, and a shift register adapted to receive a drive signal and in response thereto write-in the drive signal to the memory prior to each driving interval of time.

7 Claims, 14 Drawing Figures

FIG.3G
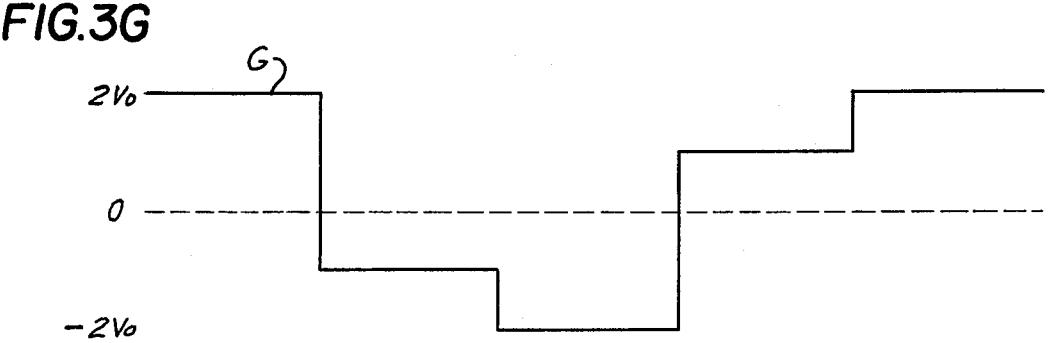
FIG.3H
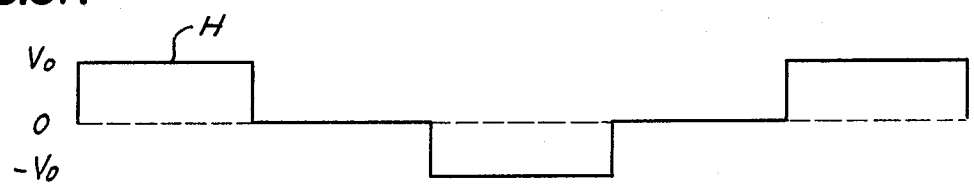
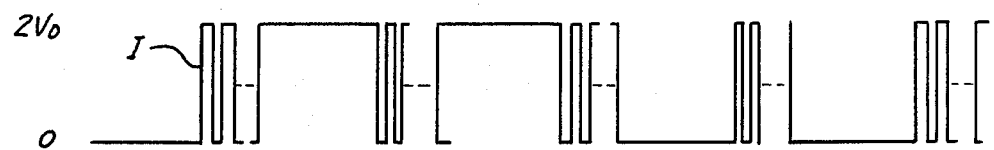
FIG.3I

DIGITAL DISPLAY DRIVING CIRCUIT

BACKGROUND OF THE INVENTION

This invention is directed to an improved digit display driving circuit, and in particular to a liquid crystal digit display driving circuit. Within the past few years, electronic instruments having digital displays have utilized liquid crystals in view of their minimum power consumption, their suitability for use with miniaturized circuitry and their passive display characteristics.

Heretofore, liquid crystal digital display drive circuits have effected a static display in one of several manners. A first type of drive circuit utilizes a register for storing parallel display signals therein, which display signals are applied to the display cells for a predetermined period. A second type of drive circuit utilizes a memory for each display digit, and applies a time division multiplexing signal to each memory to energize the display cells for a short period of time. A third type of drive circuit stores the display driving signals in series in a shift register and directly drives the display cells for a predetermined period determined by the shift register.

In the first two types of circuits, the number of output terminals for the circuitry effecting the logic operation is increased, increasing the number of input terminals of the circuit for driving the display cell, when the display is to be driven by an alternating current drive. The additional input terminals of the display cell increase the complexity of the wiring of the display drive circuit rendering more difficult the forming of same in a circuit chip by large scale integrated circuit techniques.

When the third type of drive circuit is adopted, namely, utilizing a shift register, since the signals applied to the display cell are series signals, the drive circuitry is simplified and so is the manner in which the integrated circuit is coupled thereto. However, since display signals are directly applied to the display cell by the shift register, the period of transmission of the display signals becoms related to the number of digits to be driven. If the frequency of the clock signal applied to the shift register is low, and if the transmission period is lengthy while the rate of the transmission period to the display period is small, the display cell begins to flicker thereby causing the clarity of the display to deteriorate. Also, as noted above with respect to the other drive circuits for effecting a static drive of the display cells, the number of terminals of the digital display corresponds to the number of each of the segments forming the display digits, thereby complicating the fabrication of devices utilizing such display cells, during manufacture. Moreover, in order to increase the operating life of the liquid crystal display cells, each display cell must be driven by an alternating current, the aforementioned driving circuits thereby requiring an EXCLUSIVE OR gate or other type of alternating drive circuit element for each segment forming each of the display digits.

SUMMARY OF THE INVENTION

Generally speaking, in accordance with the invention, a digital display driving circuit utilizing a two-phase drive is provided. The display includes at least first and second display digits, the first display digit and the second display digit being respectively formed by a plurality of segment electrodes, at least one digit electrode spaced apart from the segment electrodes and material disposed between the segment electrodes and digit electrodes, the material being of the type in which regions thereof are rendered visually distinguishable from adjacent regions by the application of an electric field across the regions. The regions of the material in registration with the segment electrodes are rendered visually distinguishable in response to a predetermined potential difference applied across any one of the respective spaced apart segment electrodes and the digit electrode spaced apart therefrom. A first digit electrode and second digit electrode are referenced to a potential during alternate driving intervals of time so that the regions of the material in registration therewith are prevented from being rendered visually distinguishable, each of the segment electrodes forming the first digit being coupled to a corresponding segment electrode forming the second digit to define a plurality of segment electrode pairs. A memory includes a plurality of outputs coupled to each of the pairs of segment electrodes to reference each pair of electrodes to one of a first and second drive potential, to be compared with the potential of the respective digit electrodes spaced apart therefrom, and a shift register is adapted to receive a drive signal and write-in the drive signal to the memory prior to each driving interval of time.

Accordingly, it is an object of the instant invention to provide an improved digital display drive circuit by utilizing one memory and shift register for every two display digits.

Still a further object of the instant invention is to provide a simplified inexpensive and highly reliable liquid crystal display dynamic drive circuit.

Still a further object of the instant invention is to provide an improved two-phase digital display drive circuit.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 3A through 3I are wave diagrams respectively illustrating the operation of the drive circuit depicted in FIG. 1A.

DETAILED DESCRIPTION OF THE PREFERRED EMBODIMENTS

Figure 1A:
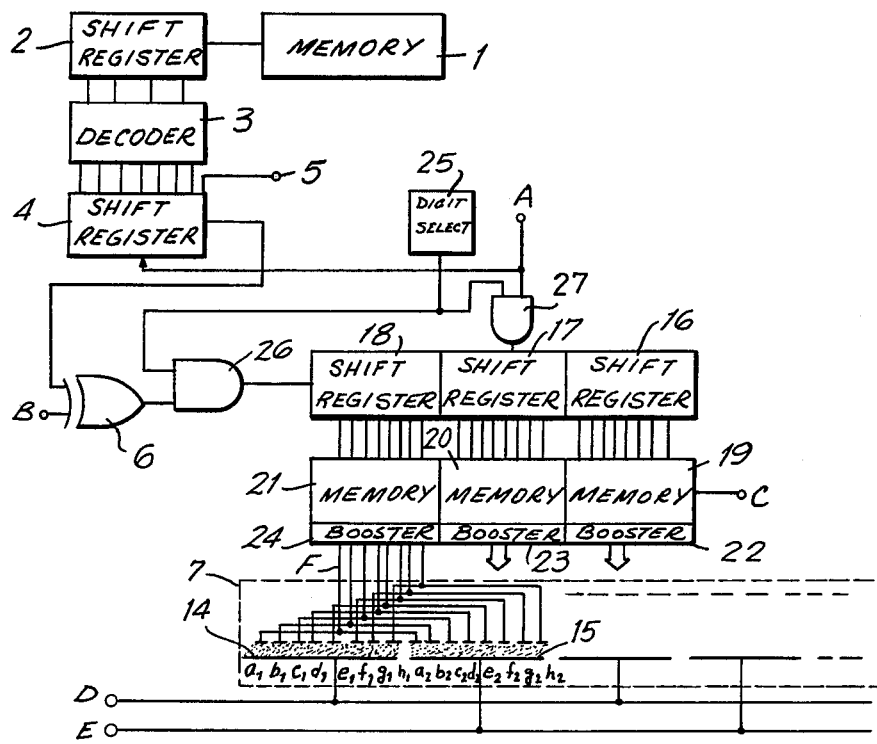
FIG. 1A is a block circuit diagram of a liquid crystal drive circuit constructed in accordance with a preferred embodiment of the instant invention.
Figure 1B:
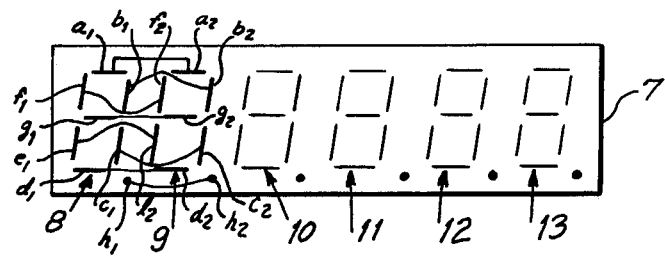
FIG. 1B is a plan view of the digital display panel illustrated in FIG. 1A.

Reference is now made to FIGS. 1A and 1B, wherein a liquid crystal display driving circuit particularly adapted for driving a display panel 7 is provided. A memory 1 is provided for retaining the information to be displayed. If the display is to be utilized with a table calculator or an analog-to-digital converter, the memory 1 stores the results of the operation performed thereby. Alternatively, if the display is to be utilized with a measuring instrument such as an electronic timepiece, the memory stores BCD coded signals produced by the respective timekeeping counters.

The contents of the memory are stored in a suitable manner to be processed and displayed by the circuitry depicted in FIG. 1A and are applied as a BCD coded signal to a four-bit shift register 2, which shift-register converts the contents of the memory transmitted thereto into a signal having four bits for each digit. The signal produced by the four-bit shift register 2 is applied to a decoder 3, which decoder applies a seven-bit signal to the eight-bit shift register 4. A signal 5 is applied to the eight-bit register to provide a signal for energizing the decimal point segment electrode. Accordingly, the eight-bit shift register provides a series drive signal having eight bits, a bit corresponding to each segment forming the conventional seven-segment display digits with an eighth bit for the decimal point segment of the display digit.

It is noted that each display digit 8 through 13 in the display panel 7 is formed of segmented electrodes spaced apart from a digit electrode. For example, digit 8 is formed of eight segmented electrodes $a_1$ through $g_1$, which segmented electrodes are spaced apart from a digit electrode 14. Disposed between the segmented electrodes and digit electrodes are liquid crystals adapted to be rendered visually distinguishable in regions in alignment with the segmented electrodes when a sufficient electric field is applied across the segmented electrode and digit electrode spaced apart therefrom, thereby rendering such regions visually distinguishable from the remaining regions surrounding same. As is explained in greater detail below, the instant invention is particularly characterized by the corresponding electrode in each pair of display digits being coupled together to be simultaneously energized. For example, electrode $a_1$ of digit 8 is coupled to electrode $a_2$ of digit 9.

Figure 3A:
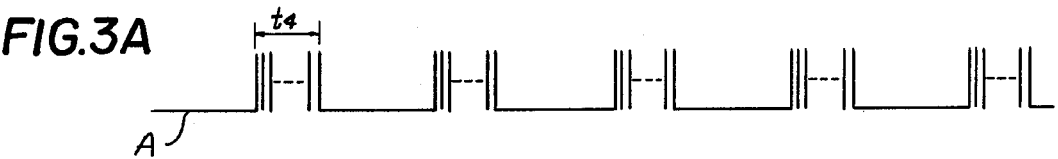
Figure 3B:
Figure 3C:

The eight-bit shift register 4 processes the series drive signal in response to a clock signal A, which clock signal has a sufficient number of pulses to correspond to the number of each of the segments comprising the digits in the display panel. Accordingly, the clock signal A has a sufficient frequency to effect a processing of a display signal for driving all of the digits by forming a single series defined word drive signal. Since display panel 7 has six digits, formed by eight segment electrodes in each digit, the word drive signal is comprised of six eight-bit series drive signals. The series drive signals processed by the eight-bit shift register 4 are applied through a single EXCLUSIVE-OR gate 6 and AND gate 26 to three series connected eight-bit shift registers 18, 17 and 16. The EXCLUSIVE-OR gate 6 comprises an alternating current driving circuit for the liquid crystals to thereby extend the life of the liquid crystals. In the circuit depicted in FIG. 1A, a liquid crystal display cell driving signal is transmitted as an inverted signal and a signal for not driving the display cell is transmitted as a non-inverted signal, the respective signals being transmitted at intervals of two words for each cycle of the alternating current signal B, as is illustrated in FIG. 3B.

For the display panel 7 illustrated in FIGS. 1A and 1B, the six display digits require that each word drive signal supplied by memory 1 to the series-connected eight-bit shift registers 16 through 18 have sufficient bits to define six digits, the sequence that the respective digits are energized determining the sequence that the series drive signal is supplied by the eight-bit shift register 4 through the current driving circuit 6 to the respective eight-bit shift registers 16, 17 and 18. Heretofore, because each of the display signals were applied in parallel to the respective digits, an alternating current driving circuit, such as EXCLUSIVE OR gate 6, was provided for each segment forming each of the digits. Nevertheless, as illustrated in FIG. 1A, the instant invention is characterized by the series driving signal requiring only a single alternating current driving circuit. The two-phase dynamic driving of the display digits in the circuit depicted in FIG. 1A, as is set forth in greater detail below, requires that the alternating current signal B be inverted only after two full word drive signals have been processed by the series-connected eight-bit shift registers 16 through 18.

Specifically, two-phase dynamic driving is effected by alternately driving one of the two digits in each of the pairs of digits in the display panel 7. For example, each segment electrode $a_1$ through $h$ of display digit 8, respectively corresponds to and is electrically coupled to each segment electrode $a_2$ through $h_2$ of display digit 9. Similarly, each segment electrode of digits 10 and 12 are respectively coupled to the corresponding electrodes of display digits 11 and 13. The display segment electrode groups ($a_1$, $b_1$, $c_1$, $d_1$, $e_1$, $f_1$, $g_1$, $h_1$, ... $a_6$, $b_6$, $c_6$, $d_6$, $e_6$, $f_6$, $g_6$, $h_6$), as indicated above, are coupled in such a manner that two segment electrodes constitute an electrode pair, the respective pairs defining a first group of electrodes. The digits 8, 10 and 12 have a first group of commonly coupled digit electrodes, including for example, digit electrode 14 of digit 8, whereas a second group of digit electrodes includes the digit electrodes 9, 11 and 13 including, for example, the digit electrode 19 of the digit 9. Accordingly, the display panel is formed by the common coupled digit electrodes forming first and second digit electrode groups and the corresponding electrically coupled pairs of segment electrodes forming segmented groups of electrodes.

Figure 2:
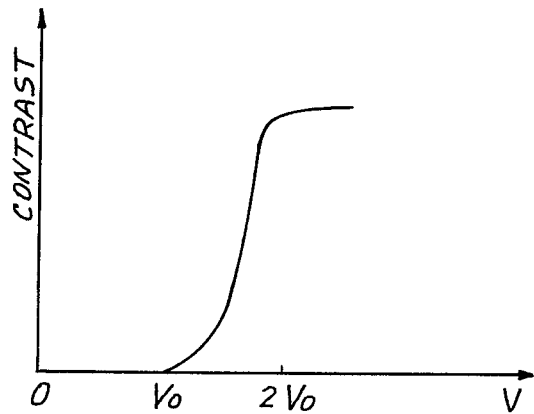
FIG. 2 is a graphical illustration comparing the contrast of the liquid crystal display cells with the strength of the electric field applied across the electrodes defining same.
Figure 3D:
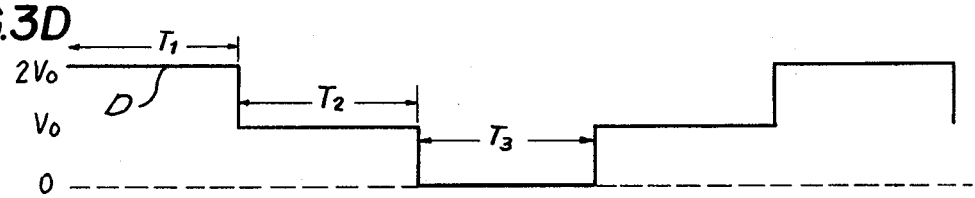
Figure 3E:
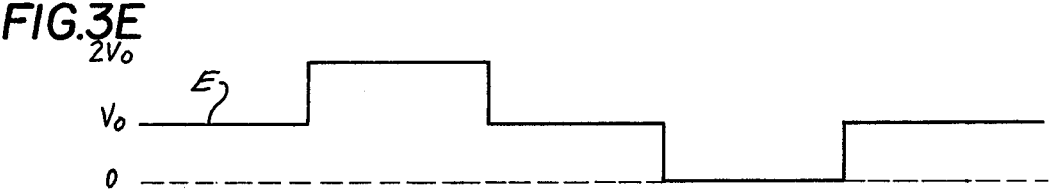

Referring now to FIGS. 1A and 3A through 3I, the two-phase driving of the display digits 8 through 13 is depicted. The signals D and E respectively illustrated in FIGS. 3D and 3E are digit signals respectively applied to digit electrode 14 of display digit 8 and digit electrode 15 of display digit 9. Each of the display cells formed by the respective segment electrodes $a_1$, $b_1$, etc., and the digit electrode 14, spaced apart therefrom, are adapted to be rendered visually distinguishable from the adjacent regions by applying theteto potential difference equal to $2V_0$. Accordingly, in order to render the display cell defined by the segment electrode $a_1$ visually distinguishable, the potential difference between the segment electrode $a_1$ and digit electrode 14 must reach $2V_0$, as is illustrated in FIG. 2. By applying to the digit electrodes signals having one of three distinct voltage levels (0, $V_0$, $2V_0$), selective energization of the respective display cells is effected.

Figure 3F:

As is illustrated in FIG. 3F, the signal F applied to the segment electrodes is a binary signal having a first potential level 0 or a second potential level $2V_0$. Accordingly, for the time period $T_1$, if the display cell defined by the segment electrode $a_1$ is to be energized and the display cell defined by segment electrode $a_2$ is not to be rendered distinguishable, the digit electrode 14 corresponding to segment electrode $a_1$ is referenced to a $2V_0$ voltage level and the digit electrode 15 corresponding to segment electrode $a_2$ is referenced to a $V_0$ level potential. Accordingly, the voltage difference across the display cell defined by segment electrode $a_1$ and digit electrode 14 is $2V_0$ thereby energizing the display cell, whereas the potential difference across the display cell defined by the segment electrode $a_2$ and digit electrode 15 during the same time interval $T_1$ is only $V_0$, and is therefore insufficient to energize the display cell formed by segment electrode $a_2$. During the next driving interval of time, $T_2$, the digit electrode 14 is referenced to a $V_0$ voltage level and the digit electrode 15 is referenced to a $2V_0$ voltage level. Accordingly, during the second drive interval of time, $T_2$, since the digit electrode 14 is referenced to a voltage level between the two distinct voltage levels of the signal F, it is impossible to effect a voltage difference of $2V_0$ between any of the segment electrodes $a_1$ through $h_1$, and an the digit electrode 14, and accordingly during the drive interval of time $T_2$ the digit 8 cannot be energized. As illustrated in FIG. 3F, since the signal F applied to the segment electrode $a_2$ of digit 9 is referenced at the same voltage level as the signal E applied to digit electrode 15, there is also an insufficient voltage difference to energize the display cell defined by segment electrode $a_2$ and digit electrode 15. However, if the signal F applied to segment electrode $a_2$ were at a 0 voltage level, the voltage difference between the segment electrode $a_2$ and digit electrode 15 would be $2V_0$, and accordingly, the display cell defined by the segment electrode $a_2$ would be energized. During the drive interval of time $T_3$, the signal D applied to digit electrode 14 has a 0 level potential and the signal F applied to the segment electrode $a_1$ has a $2V_0$ voltage level, and accordingly a $-2V_0$ voltage difference is applied across the respective electrodes to thereby energize the display cell formed thereby. It is noted that the signals D and E respectively applied to digit electrodes 14 and 15 are referenced to a $V_0$ voltage level during alternate drive intervals of time to thereby insure that the respective pairs of digits having the common segment electrodes coupled together (8 & 9, 10 & 11, 12 & 13) are adapted to be alternately driven. Signals G, and H respectively depicted in FIGS. 3G and 3H illustrate the voltage difference across the respective display cells defined by segment electrodes $a_1$ and $a_2$ during the drive intervals of time illustrated in FIGS. 3D, 3E and 3F to thereby effect an alternating current driving of the respective display cells to guarantee that the useful life of the liquid crystal display cells is extended.

As noted above, by utilizing the $V_0$, $2V_0$ two-phase dynamic AC drive, a novel multiplexing drive of the digits comprising the display panel 7 is effected. Moreover, since the display digits are divided so that each group of electrodes includes two digits, only three series-connected eight-bit registers 19 through 21 instead of six eight-bit registers are needed to effect alternating current driving of display digits.

Heretofore, when shift registers were utilized to drive display digits in a static display, a one to one correspondence between the shift registers and display digits was required, thereby requiring a shift register for each display digit. Nevertheless, as illustrated in FIG. 1A, by utilizing memories 19 through 21 respectively intermediate shift registers 16 through 18 and the respective segment electrode pairs, in response to a timing signal C, illustrated in FIG. 3C, the display signals are read into the eight-bit shift registers and then read-out of the respective memories 19 through 21, to thereby be applied to the respective pairs of segment electrodes for each driving interval of time. It is noted that booster circuits 22, 23 and 24 are disposed intermediate the memory circuit 21, 20 and 10 and the respective pairs of segment electrodes in order to elevate the potential applied to the segment electrodes from $V_0$ to $2V_0$.

It is noted that if the display segment electrodes are directly driven by the shift registers 16, 17 and 18, when the series drive signal is transmitted to the shift registers 18 through 16, the transmitted signals, illustrated as I in FIG. 3I, will cause the display digits to be flickered during the transmission period $t_4$ thereby lowering the contrast quality of the display. Moreover, the longer the transmission period $t_4$ becomes, due to an increase in the number of display digits or a reduced frequency clock signal applied to the eight-bit shift register 4, the greater the contrast deteriorating effect caused thereby.

Since the instant invention is characterized by the use of a memory for driving the display cells for a predetermined drive interval of time, the flickering of the display cell is controlled by the two-phase multiplexing thereby improving the contrast of the display panel. A digit selecting circuit 25 is coupled to the inputs of AND gates 26 and 27 in order to transmit the same drive signal, (D,E) when the respective digit signals D, E are utilized to effect the two-phase multiplexing illustrated above. The sequence of digits selected by the selecting circuit is $D_1$, $D_3$, $D_5$, $D_2$, $D_4$, $D_6$. Specifically, the respective digits form the first group for receiving the signal D correspond to digits $D_1$, $D_3$ and $D_5$ (8, 10, 12), and the group of digits adapted to receive digit signal E corresponds to digits $D_2$, $D_4$ and $D_6$ (9, 11, 13). Accordingly, AND gate 27 in response to the clock signal A and digit select circuit 25 controls the application of the clock signal A to the eight-bit shift registers 16, 17 and 18, and AND gate 26 in response to the digit selecting circuit 25 controls the transmitting of the series drive signals to the eight-bit series-connected shift registers 16, 17, and 18.

Figure 4A:
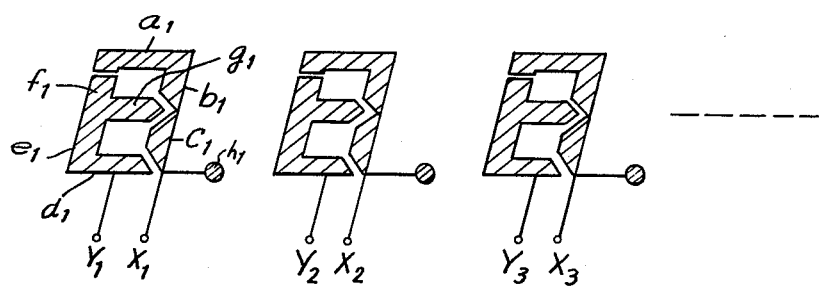
FIGS. 4A and 4B respectively illustrate the electrodes for forming a display digit in accordance with an alternate embodiment of the instant invention.
Figure 4B:
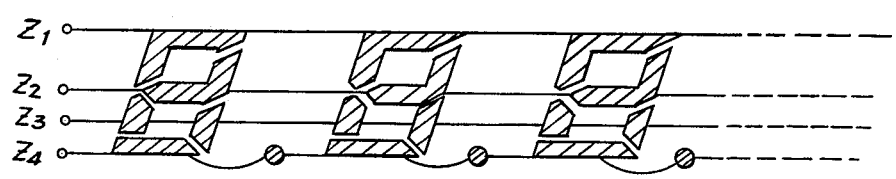

Reference is now made to FIGS. 4a and 4b, wherein opposed electrode patterns for forming display digits particularly suitable for use with the drive circuit of the instant invention are depicted. In FIG. 4a, illustrates a group of display segment electrodes $a_1$, $b_1$, $c_1$, $e_1$, $f_1$, $g_1$, $h_1$, as being divided into two groups $X_1$ and $Y_1$ so that the segments $a_1$, $b_1$, $c_1$, and $h_1$, are coupled to terminal $X_1$ and segments $d_1$, $e_1$, $f_1$, and $g_1$, are coupled to the terminal $Y_1$. The opposed surface electrodes illustrated in FIG. 4B provide the equivalent of the digit electrodes divided into four distinct electrode groups, a first group corresponding to the display cell segment electrodes $a$ and $f$, a second group corresponding to segments $f$ and $g$, a third group corresponding to segments $c$ and $e$ and a fourth group corresponding to $d$ and $h$. Accordingly, the digit signals $Z_1$, $Z_2$, $Z_3$, and $Z_4$, are respectively applied to the digit electrodes by a four-phase system, illustrated and described in U.S. Pat. No. 3,781,863 which patent is incorporated by reference as if fully set forth herein. However, when utilizing the liquid crystal display cells having the electrode pattern illustrated in FIGS. 4A and 4B in the two-phase circuit depicted in FIG. 1A, the X and Y terminals would receive the two-phase digit drive signals D and E and the segment drive signal F would be applied to the digit electrode terminals $Z_1$, $Z_2$, $Z_3$ and $Z_4$.

Accordingly, the instant invention is characterized by the use of a memory between the display digits on the display panel and the shift register adapted to process the series drive signal, to thereby improve the contrast of the display panel. Additionally, by providing a $V_0$–$2V_0$ two phase dynamic AC driving circuit for driving the display panel, the circuitry is simplified, thereby reducing the expense of manufacturing electronic instruments utilizing such displays. Moreover, the number of bits of the shift register utilized to read the series signals into the memory is reduced by the same number as the input terminal to the display panel, to wit, one-half. Also, only one alternating current drive circuit element, such as an EXCLUSIVE OR gate, is needed to effect alternating current driving of the entire display panel, thereby further simplifying the drive circuit of the instant invention.

It is noted that although the display panel illustrated in FIG. 1B includes six display digits, the number of digits capable of being driven by the instant invention is not so limited. Moreover, although two-phase dynamic driving is illustrated in the instant invention, it is noted that the number of phases is also not so limited. Finally, the memory can be formed of MOS transistors and flip flop circuits to further simplify the construction of same.

The invention accordingly comprises the features of construction, combinations of elements, and arrangement of parts which will be exemplified in the constructions hereinafter set forth, and the scope of the invention will be indicated in the claims.

It is also to be understood that the following claims are intended to cover all of the generic and specific features of the invention herein described, and all statements of the scope of the invention which, as a matter of language, might be said to fall therebetween.

What is claimed is:

1. In a display having first and second display digits, said first display digit and said second display digit being respectively formed by a plurality of segment electrodes, at least one digit electrode spaced apart from said segment electrodes and material disposed between said segment electrodes and said digit electrode, said material being of a type in which regions thereof are rendered visually distinguishable from adjacent regions by the application of an electric field across said region, regions of said material in registration with a segment electrode being rendered visually distinguishable in response to a predetermined potential difference being applied across that segment electrode and the associated digit electrode, the improvement comprising a first digit electrode of said first display digit and a second digit electrode of said second display digit being referenced during alternate driving intervals of time to a potential such that said regions of said material in registration therewith are prevented from being rendered visually distinguishable, each of said segment electrodes forming said first display digit being coupled to a corresponding segment electrode forming said second display digit, to define a plurality of segment electrode pairs, memory means for referencing each of said pairs of segment electrodes to a potential to be compared with the potential of said respective digit electrodes spaced apart therefrom, and shift register means adapted to receive a drive signal and supply said drive signal to said memory means prior to each driving interval of time, including drive circuitry processing means for producing a word signal, a digit select means intermediate said processing means and said shift register means for gating said word signal to said shift register means, each said word signal containing at least a first series digit driving signal and a second series digit driving signal, and alternating current drive means disposed intermediate said digit select means and said word signal processing means for inverting said word signal after every predetermined number of drive intervals of time, to thereby alternately reverse the polarity of the predetermined potential differences applied across any one of the respective spaced apart segment electrodes and spaced apart digit electrodes to extend the life of said visually distinguishable material.

2. A display as claimed in claim 1, wherein said first digit electrode and said second digit electrode are adapted to be respectively referenced to one of a first, second and intermediate potential levels for a driving interval of time, the potential difference between said first and second potential levels being equal to said predetermined potential difference, said intermediate potential levels being intermediate the first and second potential levels, said first digit electrode and second digit electrode being referenced to their respective intermediate voltage levels during alternating drive intervals of time, each of said pairs of said segment electrodes being referenced to third and fourth potential levels having a potential difference at least equal to said predetermined potential difference to thereby effect two-phase driving of said first and second display digits.

3. A display as claimed in claim 2, wherein said first and second potential levels are respectively substantially equal to said third and fourth potential levels.

4. A display as claimed in claim 1, wherein the number of bits adapted to be shifted by said shift register is equal to the number of segment electrode pairs in each said digit, said memory means being adapted to have said bits in said shift register means written therein in parallel form as bit signals, whereby said memory means applies each of said bit signals to said respective electrode pairs for an entire drive interval of time.

5. A display as claimed in claim 1, wherein said first and second display digits are formed of at least seven segment electrodes and one digit electrode, said material adapted to be rendered visually distinguishable in response to a predetermined potential difference being applied across any one of the respective spaced apart segment electrodes and said digit electrode being formed of liquid crystals.

6. A display as claimed in claim 1, wherein said alternating current drive means includes a single EXCLUSIVE OR gate means for assuring that a predetermined potential difference applied across each of the pairs of the respective spaced apart segment and digit electrodes in an alternating reversed polarity potential difference.

7. In a display having first and second display digits, said first display digit and said second display digit being respectively formed by a plurality of segment electrodes, at least one digit electrode spaced apart from said segment electrodes and material disposed between said segment electrodes and said digit electrode, said material being of a type in which regions thereof are rendered visually distinguishable from adjacent regions by the application of an electric field across said region, regions of said material in registration with a segment electrode being rendered visually distinguishable in response to a predetermined potential difference being applied across that segment electrode and the associated electrode, the improvement comprising a first digit electrode of said first digit and a second digit electrode of said second digit being referenced during alternate driving intervals of time to a potential such that said regions of said material in registration therewith are prevented from being rendered visually distinguishable, each of said segment electrodes forming said first display digit being coupled to a corresponding segment electrode forming said second display digit, to define a plurality of segment electrode pairs, a memory means provided for each plurality of pairs of segment electrodes forming first and second display digits, said memory means being adapted to reference each of said pairs of segment electrodes to a potential to be compared with the potential of said respective digit electrodes spaced apart therefrom, and serial shift register means adapted to receive a serial drive signal for selectively energizing each of said segment electrode pairs in at least one of said display digits and to supply said serial drive signal to the memory means prior to each driving interval of time.

* * * * *